United States Patent [19]

Wong

[11] Patent Number: 4,504,536

[45] Date of Patent: Mar. 12, 1985

[54] LAMINATED ARTIFICAL LEATHER AND METHOD OF MAKING

[76] Inventor: Winston W. Wong, 201, Tung Hwa North Rd., Taipei, Taiwan

[21] Appl. No.: 493,057

[22] Filed: May 9, 1983

[51] Int. Cl.³ .......................... B32B 3/26; B32B 5/20; B32B 5/32; B32B 27/30

[52] U.S. Cl. ...................................... 428/151; 156/79; 156/192; 156/219; 156/220; 156/230; 156/250; 428/138; 428/316.6; 428/904

[58] Field of Search ................. 428/151, 316.6, 317.9, 428/904, 138; 156/79, 184, 192, 219, 220, 230, 231, 250

[56] References Cited

U.S. PATENT DOCUMENTS

| | | | |
|---|---|---|---|
| 3,336,180 | 8/1967 | Werner | 428/904 |
| 4,017,656 | 4/1977 | Lasman et al. | 428/316.6 |
| 4,053,669 | 10/1977 | Kapasi et al. | 428/904 |
| 4,349,597 | 9/1982 | Fine et al. | 428/316.6 |

FOREIGN PATENT DOCUMENTS 6606003  11/1967  Netherlands ...................... 428/904

*Primary Examiner*—William J. Van Balen

[57] ABSTRACT

Laminated artificial leather is disclosed having in between a face layer selected from an ordinary PVC or PU sheet and a bottom layer of a foamed abraded PVC, at least one intermediate layer selected from a fabric cloth or foamed PVC, and ideally a second intermediate layer of ordinary PVC sheet. The laminate is formed by adhesion, foaming and embossing, the final product having the feel of genuine leather. In practicing the invention, fabric cloth is not used either as the bottom of the laminate or as a backing for the bottom layer.

13 Claims, 4 Drawing Figures

—101
—205

—103
—205

—101
—315
—321
—203

—101
—314
—321
—203

LAMINATED ARTIFICAL LEATHER AND METHOD OF MAKING

The present invention relates to a novel structure of a PVC laminated artificial leather characterized in that, in-between a PVC or PU face sheet and a PVC foamed abrasive bottom sheet, laminations of single or multi-layer foamed and/or non-foamed PVC material and/or a fabric cloth are sandwiched, the final product thus formed with one side ground and not on the other, gives a hand-feeling of genuine leather.

Conventional artificial leather made of plastics material usually comprises lamination of ordinary sheet of PVC with a fabric or cloth base. A further category of the so-called "coral sponge leather" is formed of a foamed abrasive layer adhered to a cloth base. While the cost is not as expensive as genuine leather the product suffers in quality and durability and is thus not competitive. Conventional artificial leather is moreover dull in appearance, is over or under soft and lacks a fine look and the hand feel of genuine leather.

In view of the fact that the artificial leather of prior art made of plastic material having short-comings as above mentioned and being incompetitive to genuine leather both in appearance, feeling and quality, there leaves room for improvement in the structure and manufacturing processes thereof. In other words, according to one aspect of the present invention there is provided a novel structure of artificial leather using PVC or PU sheet as surface and a foamed abrasive PVC sheet as bottom, laminated there between are single or multilayer of foamed and/or non-foamed PVC material, or in another aspect with PVC or PU as face layer, adhering successively with fabric cloth, PVC sheet and foamed abrasive layer, the final product thus formed would not only have an appearance just the same as that of genuine leather, but also physical properties and characters as well. Nontheless, the weathering, abrasiveness, wearing and tearing properties are even better, of course, the industrial value is greatly enhanced.

Therefore, the main object of the present invention is to provide a novel structure of artificial leather, with a foamed abrasive layer as its bottom, a PVC or PU sheet its surface, and laminated there inbetween are single or multilayer of PVC foamed and/or non-foamed layers, or in the alternative with PVC or PU as face layer, adhering sucessively with fabric cloth, PVC sheet and foamed abrasive layer. The final product would give excellent weathering, wearing properties, being color durable and hard to be damaged.

Another object of the present invention is to provide an artificial leather structure with stable quality and low water absorbing property, not liable to be corroded, easily processed, low manufacturing cost, and having hand-feeling resembling that of genuine leather, which structure is with one side ground and not on the other.

A further object of the present invention is to provide a structure of artificial leather which have hand-feeling of natural or genuine leather and is made of PVC sheet material with one side ground and not on the other, wherein the sheets are treated with leather smell flavor to imitate that on natural leather.

A still other object of the present invention is to provide an artificial leather structure having natural handfeeling, with one side ground and not on the other, wherein the surfaces of plastic sheet are perforated with micro openings to make porous to air yet still inpermeable to water, also looked further like natural leather.

A still further object of the present invention is to provide a structure of artificial leather that is possible to be mass produced with unlimited length and being able to be wound in rolls and suitable to be tailored with least wastage.

Further objects and features of the present invention will be clear through detailed description in conjunction with the annexed drawings, where:

Figure 1:
FIG. 1 is a cross section of an artificial leather of prior art wherein the product is formed with a face layer 101 of PVC sheet and a bottom layer 205 of basecloth by adhering together.
Figure 2:
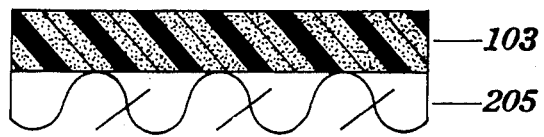
FIG. 2 is a cross section of so called "coral sponge leather" which is formed by adhering together a face layer 101 of foamed abrasive PVC and a bottom layer 205 of base-cloth.
Figure 3:
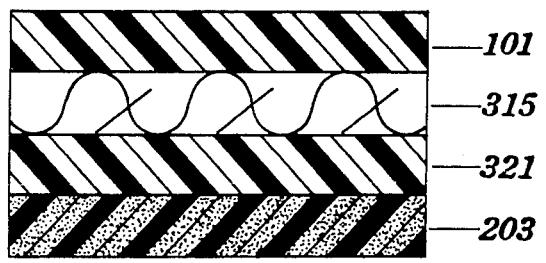
Figure 4:
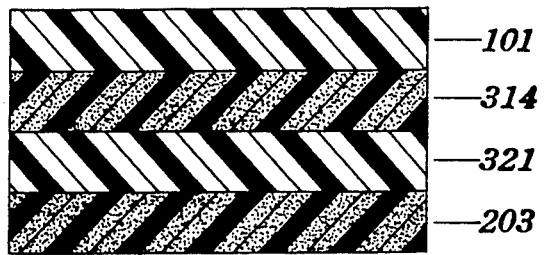

FIG. 3 is a cross section of an artificial leather structure of a first embodiment the present invention comprising an ordinary PVC sheet face layer 101, a bottom layer 203 of foamed abrasive PVC material of special fomula which will be detailed later, an intermediate combination of at least two layers including, a first intermediate layer 315 of fabric-cloth and a second intermediate layer 321 of ordinary PVC sheet, all adhered together to form lamination; and FIG. 4 is a cross section of an artificial leather structure of second embodiment of the present invention comprising a face layer of ordinary PVC 101 or PU sheet, (not identified with reference character); a bottom layer 203 of foamed abrasive PVC material of special formula, a first intermediate layer 314 of PVC foam and a second intermediate layer 321 of ordinary PVC sheet, all adhered together. In this embodiment, no fabric cloth is used.

The manufacturing steps for the embodiments using no fabric cloth are as follows for PVC as the face layer.

(I) for PVC as the face layer:
1. draw face layer, ordinary PVC sheet from sheet machine;
2. draw first intermediate layer, foamed PVC from foamed sheet machine;
3. draw second intermediate layer, ordinary PVC sheet from sheet machine;
4. draw bottom layer, foamed PVC sheet from foamed sheet machine;
5. adhere the four layers together and caused foaming in a net foaming machine, then embossing in an embossing roller;
6. grind the bottom surface to abrasiveness in a grinder;
7. wax the surfaces in a printing treatment machine; and
8. wind up into a roll of final product.

(II) when PU is used as face layer:
1. draw first intermediate layer, foam PVC sheet from foam sheet machine,
2. draw second intermediate layer, ordinary PVC sheet from sheet machine,
3. draw bottom layer, foamed PVC sheet from foamed sheet machine,
4. adhere the three above said layers together and caused foaming in a net foaming machine,
5. grind both side surfaces of the semi-finished three-layer lamination in a grinding machine, the following step is to be incorporated with step 8, 6. In another route, coat the transfer paper with PU in a coating machine, and dry,
7. coat two additional liquid type PU paste layers in coating machine,
8. adhere the product of step 7 to the three-layer lamination from step 5, dry in the coating machine,
9. aging,
10. eliminate the transfer paper, followed by surface treatment,
11. wind up to get—
12. final product.

One of the preferred fomula for above said foamed abrasive bottom layer used in the present invention is like follows:

| Ingredient | Part by weight |
|---|---|
| PVC | 100 |
| Plasticizer | 50–90 |
| Stabilizer | 2.5–3.5 |
| Foaming agent | 3–6 |
| Rayon fiber | 0–40 |
| Pigment | 10–15 |

Now the processing steps are described by way of following examples:

EXAMPLE 1

From sheet machine under 160° C., draw ordinary PVC sheet of 0.25 m/m as face layer; then from foam sheet machine under 150° C. draw 2.5× foamable sheet of 0.20 m/m as first intermediate layer; from another sheet machine under 175° C. draw DOP 40 PHR sheet of 0.25 m/m which is harder than ordinary and having better quality, as second intermediate layer, and served for the purpose of substituting the ordinary cloth; finally from foam sheet machine under 150° C. draw foamable sheet of DOP 85 PHR and Rayon fiber 15 PHR as bottom layer. Laminate the four layer, adhere, foaming and emboss in a net type foaming machine under 220° C., transfer the intermediate product onto a grinder, grind the bottom surface with 120 mesh sand paper, wax the top surface in a printing treatment machine, to enhance the natural hand-feeling of genuine leather. Finished product is inspected in inspection machine, cut to 20 Yd. length, wind up in roll and pack.

EXAMPLE 2

On a paster, one side of a fabric cloth is pasted by way of Gravure method, dried under 150° C. in a 160° C. sheet machine, adhere one ordinary PVC layer and a further layer of foamable PVC layer containing DOP 60 PHR, Rayon fiber 15 PHR. This intermediate product is transferred to a foaming machine and foamed under 230° C., then apply paste on the other side of the cloth, adhere an ordinary PVC sheet under 150° C. hot roller of an embossing machine and emboss. Grind the surface of the foamed layer with 40 mesh sand paper in a grinder, print into two-tone color in a printer, wax the ordinary PVC side under a treater, inspect, cut to 20 Yd length, wind up in roll and pack.

Artificial leather according to the present invention having structure and features like above said, with better appearance, hand-feeling as well as properties than those produced under prior art, also in better quality and lower cost even than natural leather, is of great industrial value.

EXAMPLE 3

According to the structure mentioned in second embodiment, from foam sheet machine under 160° C., draw 2.5× foamable PVC sheet of 0.32 m/m as first intermediate layer, then from another PVC sheet machine under 175° C. draw DOP 40 PHR sheet of 0.30 m/m thick which is harder than ordinary and having better quality, as second intermediate layer, and served for the purpose of substituting the ordinary cloth. Finally from foam sheet machine under 160° C. draw foamable sheet of DOP 85 PHR and Rayon fiber 15 PHR as bottom layer. Laminate the three layer, adhere, foam in a net type foaming machine under 220° C. This semi-finished product is ground in a grinding machine, the upper surface of the first intermediate layer is ground with 180 mesh sand paper, the lower surface of the bottom layer with 40 mesh sand paper. In another route, on a coating machine, coat a transfer paper with PU and dry under 130° C., coat two additional liquid type PU paste layers, adhere to the abovesaid semi-finished product with ground surfaces, dry under 140° C. Age at 50° C. for 48 hours, then eliminate the transfer paper, treat the top surface to a glossness as customer desired, the finished product is inspected in inspection machine, cut to 20 Yd. length, wind up in roll and pack.

I claim:

1. Laminated artificial leather having a natural leather hand feel, comprising an unfoamed polymeric resin outer layer, a foamed polyvinyl chloride bottom layer having an abraded outer surface and at least one intermediate layer comprising a fabric free polyvinyl chloride between the facing surfaces of the outer and bottom layers, said outer layer being embossed at its outer surface to provide a leather look.

2. An artificial leather according to claim 1, wherein the outer layer comprises polyvinyl chloride.

3. An artificial leather according to claim 1, wherein the outer layer comprises polyurethane.

4. An artificial leather according to claim 2 or 3, wherein the intermediate layer is a fabric free foamed polyvinyl chloride layer.

5. An artificial leather according to claim 4, wherein two fabric free layers of polyvinyl chloride are provided between said facing surfaces of the outer and bottom layers.

6. An artificial leather according to claim 5, wherein the bottom layer is comprised of a foamed sheet comprising DOP 85 parts per hundred resin (PHR) and Rayon fiber 15 PHR, and the intermediate layers are comprised of a first fabric foamed polyvinyl chloride layer and a second fabric free non-foamed polyvinyl layer.

7. An artificial leather according to claim 6, wherein the second intermediate layer contains DOP 40 PHR.

8. An artificial leather according to claims 1, 2 or 3, wherein the exposed surface of the outer layer contains microperforations and is treated to have an odor of leather.

9. An artificial leather according to claim 1, wherein a further layer is provided between said one polyvinyl chloride layer and the inner facing surface of the outer layer, said further layer comprising a fabric cloth.

10. An artificial leather according to claim 9, wherein the bottom layer is comprised of a foamed sheet comprising DOP 85 parts per hundred resin (PHR) and Rayon fiber 15 PHR.

11. The artificial leather of claim 1, wherein the bottom layer comprises

| Ingredient | Parts by weight |
| --- | --- |
| PVC | 100 |
| Plasticizer | 50–90 |
| Stabilizer | 2.5–3.5 |
| Foaming agent | 3–6 |
| Rayon fiber | 0–40 |
| Pigment | 10–15. |

12. A process for manufacturing laminated artificial leather having an unfoamed polyvinyl chloride face layer, a foamed polyvinyl chloride bottom layer and at least two intermediate laminations including both foamed and unfoamed polyvinyl chloride laminations comprising drawing from respective sheet machines at temperatures between about 140°–190° C., a non-foamable ordinary PVC sheet as the face layer and a foamable sheet containing DOP 85 PHR and Rayon fiber 15 PHR as the bottom layer, drawing a further polyvinyl chloride foamable layer and polyvinyl chloride non-foamable layer respectively as first and second intermediate layers consolidating and adhering the four layer laminations in a net type foaming machine for adhering, foaming and embossing between 200°–250° C., treating the surface of the bottom layer with 40–240 mesh sand paper and waxing the surface layer.

13. A process for manufacturing PVC laminated artificial leather according to claim 10, wherein the face layer is polyurethane, said process comprising the following steps: from sheet machine between 150°–190° C., draw respectively a polyvinyl chloride foam sheet, a DOP 85 PHR, Rayon fiber 15 PHR sheet as first intermediate layer and bottom layer; and a DOP 40 PHR PVC non-foaming sheet as second intermediate layer, laminate the three layers, adhere and foam in a net type foaming machine between 200°–250° C., then grind the upper and bottom surfaces of the semifinished product, transfer the laminate to a coating machine, coat a transfer paper with polyurethane paste layers, adhere the polyurethane first layer closely to the semifinished polyvinyl chloride laminate, eliminate the transfer paper, treat the top surface of the polyurethane first layer to a desired glassness, inspect the complete laminate in an inspection machine, cut to desired length, wind on a reel and pack.

* * * * *